United States Patent [19]

Eckhardt et al.

[11] Patent Number: 5,424,133
[45] Date of Patent: Jun. 13, 1995

[54] PROCESS FOR THE PREPARATION OF SUBSTRATE SURFACES FOR ADHESIVE BONDING

[75] Inventors: Gunther Eckhardt, Frieding/Post Herrsching; Rainer Guggenberger, Herrsching; Peter Koran, Weilheim; Reinhold Nowak, Adelshofen; Bernd Burger, Alling, all of Germany

[73] Assignee: THERA Patent GmbH & Co. KG Gesellschaft fur industrielle Schutzrechte, Seefeld, Germany

[21] Appl. No.: 205,105

[22] Filed: Mar. 3, 1994

[30] Foreign Application Priority Data

Mar. 3, 1993 [DE] Germany .............. 43 06 642.9

[51] Int. Cl.⁶ .............................................. B32B 9/04
[52] U.S. Cl. ............................ 468/447; 51/307; 51/308; 156/153; 427/299; 427/322
[58] Field of Search ............... 51/307, 308, 319, 320; 156/153; 427/299, 322; 428/447

[56] References Cited

U.S. PATENT DOCUMENTS

| | | | |
|---|---|---|---|
| 5,024,711 | 6/1991 | Gasser et al. | 156/153 |
| 5,185,184 | 2/1993 | Koran et al. | 427/299 |

FOREIGN PATENT DOCUMENTS

| | | |
|---|---|---|
| 0334269 | 3/1988 | European Pat. Off. . |
| 0326097 | 8/1989 | European Pat. Off. . |
| 0444701 | 9/1991 | European Pat. Off. . |
| 0481115 | 4/1992 | European Pat. Off. . |
| 3013970 | 4/1980 | Germany . |
| 3330512 | 8/1983 | Germany . |
| 3802042 | 1/1988 | Germany . |
| 4006442 | 3/1990 | Germany . |
| 4006970 | 3/1990 | Germany . |
| 4113655 | 4/1991 | Germany . |
| 4117523 | 5/1991 | Germany . |
| 1065442 | 9/1982 | U.S.S.R. . |

OTHER PUBLICATIONS

Patents Abstracts of Japan, vol. 5, No. 58 (1981), JP 56-10577(A).

Primary Examiner—Michael Lusignan
Attorney, Agent, or Firm—Birch, Stewart, Kolasch & Birch

[57] ABSTRACT

A process of preparing a substrate surface for a subsequent adhesive bonding, coating or pouring operation, by applying to the substrate an adhesion promoting composition comprising either:

(A), (B) and (C); or (A) and (C); or (B) and (C); or (B) of the following ingredients (A)–(C):

(A) 0.01 to 90 wt. % of optionally silanized material with a particle size <5 μm and a hardness greater than that of the substrate surface, (B) 20 to 100 wt. % of silanized, silicon-containing material with an average particle size of 2 to 2100 μm, (C) an abrasion agent with a particle size 5 μm as the remainder;

wherein the quantities quoted are relative to the total weight of (A)–(C). In the process the composition is applied to the substrate surface using horizontal or predominantly horizontal forces of friction, so that an adhesion promoting layer is formed on the substrate surface. The adhesion promoting composition may optionally contains either a bonding agent or an auxiliary agent, and in a preferred embodiment, the adhesion promoting composition is in the form of a grinding body and contains a bonding agent.

24 Claims, No Drawings

PROCESS FOR THE PREPARATION OF SUBSTRATE SURFACES FOR ADHESIVE BONDING

FIELD OF THE INVENTION

The invention is concerned with providing a process of preparing a substrate surface for a subsequent adhesive bonding, or coating, or pouring operation. In the process, predominantly horizontal forces of friction are used to apply an adhesion promoting composition to the substrate surface, such that an adhesion promoting layer is formed on the substrate surface.

The invention is also concerned with improving the strength of composites which comprise metal and/or plastic surfaces and liquidly applied organic adhesives that cure to give a plastic.

BACKGROUND OF THE INVENTION

Surface preparation of substrates for bonding together has been carried out in very different ways in the prior art. For example, it is known to pretreat surfaces which are to be bonded in suitably composed pickling baths. Also, corona pretreatment of plastic surfaces and low-pressure plasma treatment are known to be very effective methods of treatment. Clear improvements in bond strength can be obtained with such methods, but their application is associated with high expenditures.

It is further known to treat substrates to be bonded together with solvents or mechanically with grinding, with emery and sand-blasting being preferred versions of the latter. However, improved climate resistance of the bonded composites is not obtained with such methods.

EP-A-O 326 097 provides a process for the preparation of a substrate surface for bonding with a plastic in which an adhesion promoting layer is deposited on the substrate surface as a sand-blasting composition which, relative to the weight of the total sand-blasting composition, consists of:
(A) 0.01 to 90 wt. % of an optionally silanized material with a particle size <5 μm and a hardness greater than that of the substrate surface and/or
(B) 20 to 100 wt. % of a silanized, silicon-containing material with a particle size of 2 to 200 μm, and
(C) a sand-blasting agent with an average particle size >5 μm as the remainder.
The thus obtained adhesion-promoting layer is optionally silanized.

A similar process is described in EP-A-0 444 701. In order to obtain a good coating of the desired layer with the disclosed process, it is necessary to blast the sand-blasting agent at an angle of 90°±10°. The coating decreases rapidly as the blasting angle decreases.

Disadvantages are associated with sand-blasting processes like those described above. For example, high expenditures are required for apparatus, and the creation of dust causes problems, since the removal of dust often requires costly measures.

SUMMARY OF THE INVENTION

It is an object of the invention to provide a surface-preparation process wherein an adhesion promoting layer is applied to a substrate, which layer can increase bond strength between surfaces and resistance to climate, while avoiding disadvantages of prior known processes. It is also an object to provide a surface treatment process which in particular guarantees a dust-free and simple application of a pretreatment agent.

The above objects, and others, are achieved by a process wherein an adhesion promoting layer is applied to a substrate surface which is to be subsequently adhesively bonded (e.g., glued) or coated.

In the inventive process, an adhesion promoting composition comprising:
(A) 0.01 to 90 wt. % of an optionally silanized material with a particle size <5 μm and a hardness greater than that of the substrate surface and/or
(B) 20 to 100 wt. % of a silanized, silicon-containing material with an average particle size of 2 to 200 μm, and
(C) an abrasion agent with a particle size >5 μm as the remainder,
wherein the quantities quoted are relative to the total weight of the composition comprising (A) and/or (B) and (C), and wherein the composition additionally may optionally contain:
(D) a bonding agent which is capable of forming a solid body with the aforementioned components (A)–(C), and
(E) an auxiliary agent for achieving a suitable processing consistency, selected from the group consisting of a diluting agent, a dispersion agent and a mixture of these auxiliaries;
is deposited on a substrate surface which is to be subsequently adhesively bonded or coated, and the components (A) and/or (B) in the composition are fixed on the substrate by applying to the substrate surface a horizontally or predominantly horizontally acting force of friction.

Surprisingly, considerable improvements in bond strength between surfaces to be adhesively bonded can be obtained with the inventive process.

As already mentioned above, it is a requirement of the process taught in EP-A-O 326 097 that the sand-blasting composition used therein be blasted at an angle of 90°±10°, relative to the substrate surface. Otherwise, it is disclosed that there is no satisfactory coating and no satisfactory improvement in bond strength. As such, before the present invention it was expected that practically no improvement in bond strength would result upon exposure of a substrate surface to a horizontally or predominantly horizontally acting force of friction, after applying thereto one of the adhesion promoting compositions taught herein. Rather, it was expected that with a horizontally or predominantly horizontally acting force of friction (e.g., with a simple mechanical grinding), no sufficient bonding between a substrate surface and component (A) and/or (B) of the inventors' adhesion promoting compositions could be achieved, so that an adequate adhesion promoting layer would result on the substrate surface. Moreover, it was expected if such components were brought into contact with a substrate surface using only a moderate force, they would not form a firm bond with the substrate surface, because there is practically no vertical impacting of particles on the substrate surface in the inventors' process. Surprisingly, however, the inventors discovered that substantial improvements in bond strength are obtained with the process of the present invention, and that the improvements are comparable with improvements in bond strength obtained in EP-A-0 326 097, wherein sand-blasting procedures are utilized to impart an adhesion promoting layer to a substrate surface. At the same time, the inventive process possesses advantages over prior processes which require sand-blasting, since the inventors' processes only require a small expenditure on apparatus and no dust problem arises.

The adhesion promoting composition to be used according to the present invention can be used as a solid, as powder, or as a pasty to liquid preparation, or it may be used in any combination of these forms.

The use of the composition in a liquid or pasty state requires the use of solvents or dispersion agents, the use of readily volatile substances therein is preferred.

In a preferred version of the inventive process, the composition is deposited in a liquid or pasty form onto a substrate surface to be subsequently bonded or coated, and the solvent or dispersion agent is evaporated.

According to a particularly preferred version of the inventive process, a solid is produced from one or more of the components (A)–(C) using a bonding agent (D). This solid can take the form of a sheet-like structure which is optionally flexible, or it may take the form of a heavy solid structure which is optionally in the form of a grinding body. Preferred as suitable bonding agents are inorganic bonding agents (e.g., silicate or ceramic bonding agents), organic bonding agents (e.g., reactive resins or adhesives in the broader sense). Exemplary bonding agents include high molecular weight polymers that are soluble in water or which can be dispersed in water, organic high molecular weight polymers or organic polymer forming substances which can be dissolved or dispersed in a readily volatile organic solvent, and inorganic water dilutable polymers or polymer forming compounds.

The force of friction which is applied to the substrate surface in the inventive process, can be introduced in a multitude of ways, and acts at the boundary layer which occurs between the adhesion promoting composition and the surface of the substrate which is to be subsequently bonded or coated. The applied force of friction should normally be in a horizontal, or virtually and predominantly in a horizontal direction, relative to the substrate surface.

One simple method for applying the force of friction is to manually rub the adhesion promoting composition on the surface of the substrate, optionally via a suitable receiver for the rubbing body, or using a flexible sheet-like auxiliary, for example with a powdery composition.

Abrasive relative movements between the composition and the substrate surface can also be obtained by other known methods. Such methods can include grinding with a suitable molded body, for example with a rotating or oscillating molded body, or the like. It is also possible to set the substrate and/or the grinding body in motion by means of ultrasound.

The components (A) to (C) of the adhesion promoting composition and their preferred forms are described in EP-A-0 326 097. The contents and the entire disclosure of EP-A-0 326 097 are expressly incorporated by reference herein.

In the adhesion promoting composition which is used to impart an adhesion promoting layer to the substrate surface, there is used as the component (A), 0.01 to 90 wt. %, relative to the weight of components (A) to (C), of an optionally silanized material with a particle size <5 μm and a hardness greater than that of the substrate surface. Preferably there is used 0.1 to 30 wt. % of the component (A), and in particular there is used a material with a particle size <1 μm. Particularly preferred is a component (A) having a particle size <0.1 μm, wherein here, as in the following, the term "particle size", means the primary particle size.

The hardness of the substrate and of component (A) can be determined according to the Mohs, Brinell, Knoop or Vickers methods, the same method to be used to test the hardness of substrate and component (A) in each case. For testing the hardness of very fine material (<1 μm), the same material in coarser form is used.

In a preferred version, the material used as component (A) is silanized. A silicon-containing material is preferably used as component (A). Particularly preferred as component (A) is 0.01 to 50 wt. % of an optionally silanized, silicon-containing material.

Particularly preferred as component (A) are: quartz, quartz glass, silicate glass with at least 10 wt. % silicon, silicon carbide, silicon nitride and/or microfine silicic acid; aluminum oxide, titanium dioxide and/or zirconium oxide and the other oxides, nitrides and/or carbides of elements of the third and fourth main groups of the periodic chart and of the subsidiary group 4b. This material can, for example, have an average particle size of 10 μm, although it must still contain at least a 0.01 wt. % proportion of an optionally silanized material <5 μm. Quite particularly preferred is microfine silicic acid with an average particle size of 0.001 to 0.05 μm, such as pyrogenic silicic acid or precipitation silicic acids. Component (A) must be inert under the reaction conditions. Preferred components (A) are inert even at temperatures >1000° C.

Used as component (B) are 20 to 100 wt. %, relative to the weight of components (A) to (C), of a silanized, silicon-containing material with an average particle size of 2 to 200 μm; preferably there is used 50 to 100 wt. % with a preferred average particle size of 5 to 100 μm. Quartz, quartz glass, silicate glass with at least 10 wt. % silicon, silicon nitride, silicon carbide or ceramic material with at least 10 wt. % silicon can be used, for example, as the silanized silicon-containing material. Particularly preferred are quartz glass, silicate glass and amorphous' silicon nitride. On using silicate glasses and silicon-containing ceramic material, materials with a silicon content >30 wt. % are preferred.

The abrasive with an average particle size >5 μm which is used as component (C) in the adhesion promoting composition of the inventive process is a usual abrasive, i.e., a material with a high degree of hardness, such as, for example, aluminum oxide (corundum). The average particle size is from >5 μm up to 500 μm, preferably 20 to 250 μm. Quartz, quartz glass, silicates, silicate glasses, silicon nitride, silicon carbide or ceramic materials can, however, also be used advantageously. A material of the same composition, but of a different particle size, can be used as component (A) and/or (B) and (C).

If constituents of the adhesion promoting composition are silanized, they preferably contain 0.1 to 20 wt. % silane, especially preferably 1 to 5 wt. %, relative to the weight of the constituents of the composition. Silanization is carried out in a manner known, per se, such as is used, e.g., in filler technology. All silanes customarily used are suitable for the production of the constituents of the composition used in the inventive process. For example, vinyl trimethoxy silane, 3-glycidoxypropyl trimethoxy silane, 3-methacryloxypropyl trimethoxy silane and tetramethyl divinyl silazane are especially suitable. The compounds are preferably used in the form of an alcoholic and/or aqueous acidic solution (e.g., acetic acid).

It has proved particularly advantageous, both during the silanization of constituents of the preparation and also during the silanization of the surface treated according to the invention, to use in each case silanes with the same functional groups, which are present in a monomer of the substrate or a subsequently applied adhesive or coating, (e.g., a plastic adhesive). Thus, for gluing metals with epoxide resins for example, silanes with epoxy end groups are advantageously used.

If the subsequently applied adhesive to be used for bonding is an activatable adhesive, then in particular anaerobic adhesives are to be used for the bonding operations. In such instances—when the substrate surfaces are non-metallic surfaces—an activator which catalyses and/or accelerates the hardening of the activatable adhesive can also be added to components (A) to (C) according to the teaching of EP-A-0 444 701. The contents and the entire disclosure of the EP-A-0 444 701 are incorporated herein by reference in their entirety. Exemplary of such activators are metal powders, metal salt powders, amines, ammonium compounds and/or other basic compounds in quantities of 0.001 to 25, preferably 0.1 to 10 and in particular 1 to 10 wt. %, relative to the total weight of components (A) to (C).

The process according to the invention is suitable for the preparation of substrate surfaces which are to be bonded to other objects or which are to be coated. It is also suitable for application purposes in which pouring operations are carried out over a substrate surface.

Example 1

A composition consisting of 95 parts by weight of a corundum abrasive with an average particle size of 240 $\mu$m and 7 parts by weight pyrogenic silicic acid with an average particle size of 48 nm was used in the powdery state for the preparation of substrate surfaces. Samples of polypropylene measuring $5\times 30\times 120$ mm which had been degreased using a cellulose cloth dampened with isopropanol were used.

The composition was deposited on the polypropylene in an approximately 1 mm thick layer and rubbed manually against the substrate surface for 30 seconds using a linen fabric.

After removal of the preparation by knocking and blowing off, gluing was carried out with a 2-component epoxide resin (Duopox E32 from DELO Industrieklebstoffe, Munich-Gräfelfing).

An overlapping adhesive bonding operation was carried out, and after 72 hours storage time, the tensile shearing strength of the bonded composite was determined according to DIN 53 283.

The tensile shearing strength values of the samples pretreated according to the invention were 2.8 N/mm$^2$. In contrast, with samples which had been degreased only with isopropanol, tensile shearing strength values of only 1.8 N/mm$^2$ were achieved.

Example 2

A composition and degreased test pieces according to Example 1 were used.

10 test pieces were firmly clamped next to each other, spread with the preparation according to Example 1 to a thickness of 1 mm and treated for 12 seconds with a standard commercial oscillatory grinding device.

Adhesive bonding and measurement of strength were analogous to Example 1.

With the test pieces pretreated according to the invention, a tensile shearing strength of the bonded composite of 4.6 N/mm$^2$ was achieved.

Example 3

A composition consisting of 85 parts by weight of a corundum abrasive with an average particle size of 110 $\mu$m and 15 parts by weight pyrogenic silicic acid with an average particle size of 48 nm which had been silanized with 3% of 3-methacryloxy propyltrimethoxy silane was used for improving the bonding strength of high gold-containing alloys.

Small sample sheets made from Degulor M (Degussa) measuring $2\times 10\times 50$ mm were pretreated for 30 seconds with the powdery composition in the manner described in Example 1.

The adhesive bonding of the pretreated small sheets (10 mm overlap) with a radically polymerizing liquid plastic from ESPE gave tensile shearing strength values of 2.9 N/mm$^2$. Without pretreatment, tensile shearing strengths of only 0.8 N/mm$^2$ were achieved.

On using an oscillatory grinder according to Example 2 employing the composition according to this example and small sheets made from Degulor-M, tensile shearing strengths of 6.7 N/mm$^2$ were achieved under comparable conditions.

Example 4

Circular sheets with a diameter of 36 mm and a thickness of 10 mm were molded using an intensive mixing procedure on a planetary stirrer from a composition consisting of 28.2 parts by weight of a corundum abrasive having an average particle size of 250 $\mu$m, 25 parts by weight of corundum with an average particle size of 110 $\mu$m, 20.5 parts by weight of a pyrogenic silicic acid with an average particle size of 45 nm, 8.2 parts by weight of 3-glycidoxypropyl trimethoxy silane and 18.1 parts by weight of water.

The molded articles were subjected to the following temperature treatment:

4 hours at 80° C., 6 hours at 135° C., 2 hours at 650° C. and 2 hours at 950° C.

The disk-shaped bodies were bonded to plate-shaped steel receivers with a quick-curing 2K-epoxide resin adhesive from DELO-Industrieklesbstoffe and the thus-obtained grinding bodies used for the pretreatment of small degulor M-sheets.

Through this pretreatment, tensile shearing strength values of 4.9 N/mm$^2$ were achieved, while the tensile shearing strength of glued composites with non-pretreated small Degulor M-sheets was 0.8 N/mm$^2$ using the same adhesive and test conditions.

We claim:

1. A process of preparing a substrate surface for a subsequent adhesive bonding, coating or pouring operation, wherein the process comprises the steps of:
   Step 1—depositing onto the substrate surface an adhesion promoting composition which comprises either:
   (A), (B) and (C); or (A) and (C); or
   (B) and (C); or (B)
   of the following ingredients (A)–(C):
   (A) 0.01 to 90 wt. % of an optionally silanized material having a particle size <5 $\mu$m and a hardness greater than that of the substrate surface,
   (B) 20 to 100 wt. % of a silanized, silicon-containing material with an average particle size of 2 to 200 $\mu$m, (C) an abrasion agent with a particle size >5 μm as the remainder,
wherein the weight % quantities quoted for (A)-(C) are relative to the total weight of the composition comprising (A)-(C), and wherein the adhesion promoting composition may optionally contain either:
- (D) a bonding agent which is capable of forming a solid body with the components (A)-(C), or
- (E) an auxiliary agent for obtaining a suitable processing consistency, selected from the group consisting of a dilution agent, dispersion agent and mixtures thereof; and Step 2—applying a horizontally or a predominantly horizontally acting force of friction to the substrate surface, whereby the component (A) or (B) of the adhesion promoting composition is fixed on the substrate; and provided that neither of said Steps 1 and 2 is a sandblasting step.

2. The process according to claim 1, wherein the adhesion promoting composition is a liquid or a pasty composition and contains a solvent or a dispersion agent for achieving a suitable processing consistency.

3. The process according to claim 1, wherein the adhesion promoting composition contains a readily volatile solvent or a dispersion agent.

4. The process according to claim 2, wherein the adhesion promoting composition contains a readily volatile solvent or a dispersion agent.

5. The process according to claim 1, wherein the adhesion promoting composition contains a component (D) bonding agent which is an organic or inorganic bonding agent, in a proportion of 0.5 to 10 wt. % of the total weight of the composition.

6. The process according to claim 1, wherein the adhesion promoting composition comprises a component (D) bonding agent which is a high molecular weight polymer which is soluble in water or which can be dispersed in water.

7. The process according to claim 1, wherein the adhesion promoting composition comprises a component (D) bonding agent which is an organic high molecular weight polymer or an organic polymer-forming substance, which can be dissolved or dispersed in a readily volatile organic solvent.

8. The process according to claim 1, wherein the adhesion promoting composition comprises a component (D) bonding agent which is an inorganic, water-dilutable polymer or a polymer-forming compound.

9. The process according to claim 1, wherein the adhesion promoting composition exists in the form of a grinding body, and wherein the grinding body is established through the type and concentration of the component (D) bonding agent such that a surface of the grinding body is constantly renewed by removal.

10. The process according to claim 9, wherein the grinding body is produced by the steps of:
intensively mixing together 1 to 90 parts by weight of components (A)-(C) with 0.5 to 50 parts by weight of a silane;
forming a pasty composition from the mixture;
molding a blank from the pasty composition; and
stepwise thermally treating the blank at temperatures in the range of 20° to 1000° C.

11. The process according to claim 9, wherein the grinding body is produced by mixing 50 to 100 parts by weight of components (A) to (C), 0.5 to 50 parts by weight of at least one silane corresponding to component (D), 0.5 to 50 parts by weight of water having a pH in the range from 2.5 to 5 corresponding to component (E), intensive mixing of the components at temperatures from 10° C. to 80° C., removal of the volatile components by vacuum treatment, pressing the mixture to blanks and thermally treating those blanks at temperatures in the range of 20° to 1000° C.

12. The process according to claim 9, wherein the grinding body is a sheet structure which is bonded on to a suitable sheet or a rotationally symmetrical receiver.

13. The process according to claim 1, wherein the adhesion promoting composition is in a powdered form and is brought in between the substrate surface and a sheet-like power-transmission agent, and wherein the power-transmission agent is set into a rubbing motion relative to the substrate surface.

14. The process according to claim 1, wherein the adhesion promoting composition is in a powdered form and is brought in between the substrate surface and a grinding device, and wherein the grinding device is set into a rubbing motion relative to the substrate surface.

15. The process according to claim 1, wherein the adhesion promoting composition is in the form of a paste containing a solvent or a liquid dispersion agent and wherein:
a layer of the paste is deposited on the substrate surface,
the solvent or the dispersion agent is evaporated, and
the substrate surface is worked with a grinding device.

16. The process according to claim 6, wherein the adhesion promoting composition is in the form of a paste containing a solvent or a liquid dispersion agent and wherein:
a layer of the paste is deposited on the substrate surface,
the solvent or the dispersion agent is evaporated, and
the substrate surface is worked with a grinding device.

17. The process according to claim 1, wherein the component (A) has an average particle size smaller than 1 μm.

18. The process according to claim 1, wherein the component (A) is a microfine silicic acid with an average particle size of 0.001 to 0.05 μm.

19. The process according to claim 1, wherein the adhesion-promoting composition contains in addition to the components (A)-(C), an activator for an activatable anaerobic adhesive.

20. The process according to claim 1, wherein the adhesion promoting composition contains in addition to the components (A)-(C), an activator for an activatable adhesive;
wherein the activator is a metal powder, a metal salt powder, an amine compound, an ammonium compound, or a basic compound other than an amine or an ammonium compound, and
wherein the activator is present in a quantity of 0.001 to 25 wt. %, relative to the total weight of the components (A)-(C) of the composition.

21. The process according to claim 1, wherein the horizontally or predominantly horizontally applied force of friction acts at a boundary layer which occurs between the adhesion promoting composition and the substrate surface.

22. A grinding body, wherein the grinding body contains an adhesion promoting composition comprising either:

(A), (B), (C) and (D); or
(A), (C) and (D); or
(B), (C) and (D), or
(B) and (D)
of the following ingredients (A)–(D):

(A) 0.01 to 90 wt. % of an optionally silanized material having a particle size <5 μm and a hardness greater than that of the substrate surface, (B) 20 to 100 wt. % of a silanized, silicon-containing material with an average particle size of 2 to 200 μm, (C) an abrasion agent with a particle size >5 μm as the remainder, and (D) a bonding agent which is capable of forming a solid body with the components (A)–(C);

wherein the grinding body may optionally contain an auxiliary agent for obtaining a suitable processing consistency, selected from the group consisting of a dilution agent, dispersion agent and mixtures thereof; and wherein the grinding body is established through the type and concentration of the component (D) bonding agent, such that a surface of the grinding body is constantly renewed by removal.

23. The grinding body of claim 22, wherein the grinding body is produced by intensively mixing together 1 to 90 parts by weight of components (A)–(C) with 0.5 to 50 parts by weight of a silane;

forming a pasty composition from the mixture;

molding a blank from the pasty composition; and stepwise thermally treating the blank at temperatures in the range of 20° to 1000° C.

24. The grinding body of claim 22, wherein the grinding body is a sheet structure which is bonded on to a suitable sheet or a rotationally symmetrical receiver.

* * * * *